US011508412B2

(12) United States Patent
Takeda et al.

(10) Patent No.: US 11,508,412 B2
(45) Date of Patent: Nov. 22, 2022

(54) VIDEO EDITING APPARATUS, METHOD AND PROGRAM FOR THE SAME

(71) Applicant: NIPPON TELEGRAPH AND TELEPHONE CORPORATION, Tokyo (JP)

(72) Inventors: Toshiaki Takeda, Tokyo (JP); Dan Mikami, Tokyo (JP); Yoshinori Kusachi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/421,364

(22) PCT Filed: Dec. 25, 2019

(86) PCT No.: PCT/JP2019/050734
§ 371 (c)(1),
(2) Date: Jul. 7, 2021

(87) PCT Pub. No.: WO2020/145138
PCT Pub. Date: Jul. 16, 2020

(65) Prior Publication Data
US 2022/0093131 A1   Mar. 24, 2022

(30) Foreign Application Priority Data

Jan. 9, 2019   (JP) .............................. JP2019-001915

(51) Int. Cl.
*G11B 27/00* (2006.01)
*G11B 27/031* (2006.01)
(Continued)

(52) U.S. Cl.
CPC .......... *G11B 27/031* (2013.01); *G06V 40/103* (2022.01); *G11B 27/34* (2013.01); *H04N 5/2628* (2013.01); *H04N 13/282* (2018.05)

(58) Field of Classification Search
USPC ................ 386/278, 280, 282, 263, 223, 224
See application file for complete search history.

(56) References Cited

U.S. PATENT DOCUMENTS

| 2018/0160049 A1* | 6/2018 | Aizawa ................ H04N 5/2224 |
| 2021/0136349 A1* | 5/2021 | Itakura .................. H04N 5/232 |

OTHER PUBLICATIONS

Ikeya et al. (2012) "Image Expression Using Multiple Robot Camera System" Proceedings of 2012 Annual Meeting of the Society of Video and Information Media, Aug. 29, 2012.
(Continued)

*Primary Examiner* — Daquan Zhao

(57) ABSTRACT

A video image editing device or the like, capable of editing a wraparound video image generated by using a plurality of video images captured by multi-viewpoint cameras to be comfortably viewable by viewers, is provided. Based on information about the positions and the sizes of X subjects, a polynomial expression regarding the position of the subject and a polynomial expression regarding the size of the subject are generated. Correction or interpolation of the positions of the H subjects is performed by a polynomial approximation curve using the polynomial expression regarding the position of the subject, correction or interpolation of the sizes of the N subjects is performed by a polynomial approximation curve using the polynomial expression regarding the size of the subject, and the sizes of the N subjects are expanded or contracted with an expansion/contraction parameter p. An intermediate image is generated from two images of the same size corresponding to the photographing devices adjacent to each other, and a wraparound video image is generated, with a parameter indicating the length of the wraparound video image being represented by Tp.

9 Claims, 15 Drawing Sheets

(51) Int. Cl.
*G11B 27/34* (2006.01)
*H04N 13/282* (2018.01)
*G06V 40/10* (2022.01)
*H04N 5/262* (2006.01)

(56) References Cited

OTHER PUBLICATIONS

Cao et al. (2017) "Realtime Multi-Person 2D Pose Estimation using Part Affinity Fields" CVPR, Apr. 14, 2017.
Tada et al. (2004) "Visual KANSEI Modeling based on Focal Area Analysis and Hierarchical Classification" IEICE Transactions, D-II,Information Systems, II-Pattern Processing, vol. J87-D-II, No. 10, pp. 1983-1995.

* cited by examiner

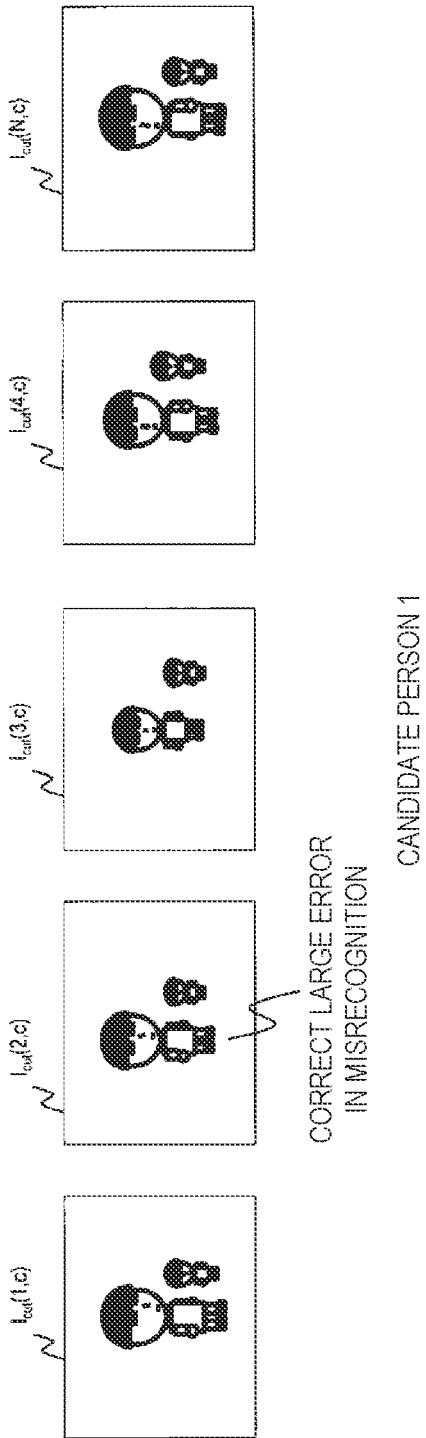

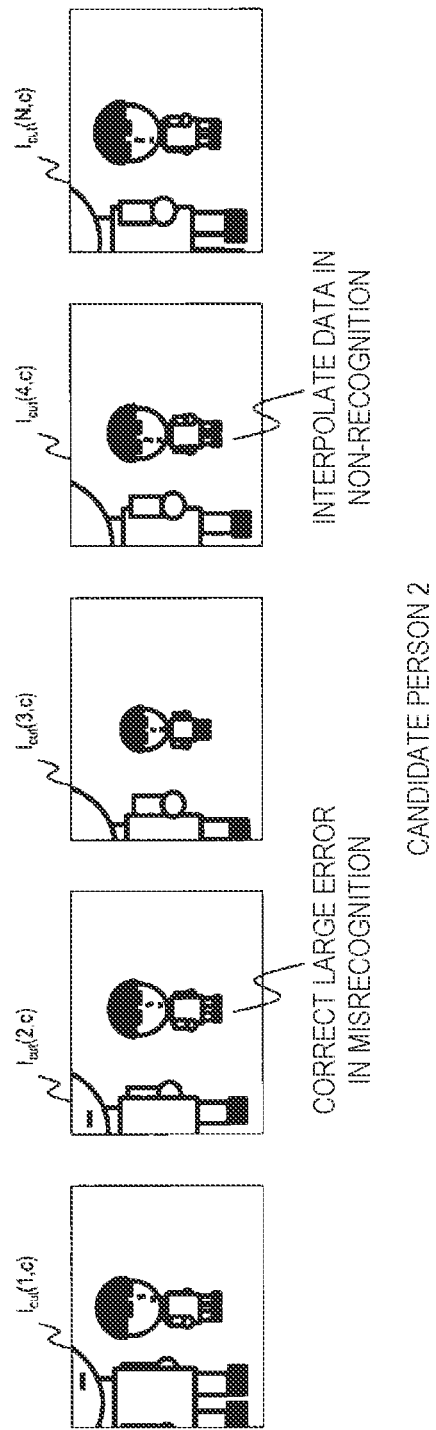

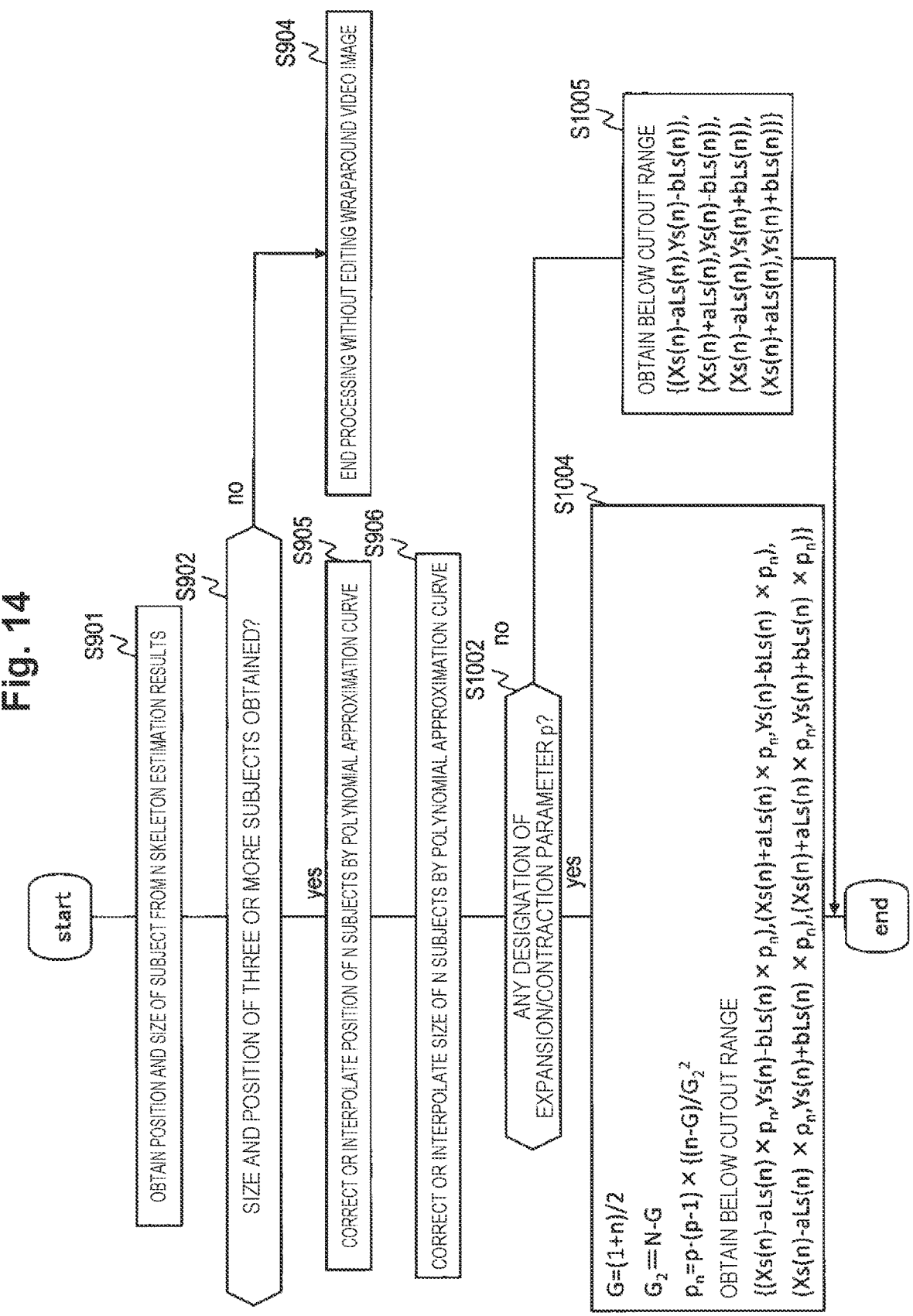

VIDEO EDITING APPARATUS, METHOD AND PROGRAM FOR THE SAME

CROSS-REFERENCE TO RELATED APPLICATIONS

This application is a U.S. 371 Application of International Patent Application No. PCT/JP2019/050734, filed on 25 Dec. 2019, which application claims priority to and the benefit of JP Application No. 2019-001915, filed on 9 Jan. 2019, the disclosures of which are hereby incorporated herein by reference in their entireties.

TECHNICAL FIELD

The present invention relates to a video image editing device for editing video images captured by a plurality of photographing devices, a method thereof, and a program.

BACKGROUND ART

Conventionally, a video image editing method for obtaining a video image that seems to be captured as if a moving subject is captured by a camera in a wraparound manner (hereinafter, referred to as a wraparound video image), with multi-viewpoint cameras arranged so as to surround the subject by switching the captured video images along the sequence of the cameras (for example, see Non-Patent Literature 1).

FIG. 1 is an illustration showing exemplary arrangement of multi-viewpoint cameras. In this example, N time-synchronized cameras 20-$n$ are arranged so as to surround a subject 201. Note that n is an index indicating a photographing device (in this example, camera), and n=1, 2, . . . , N is established. Note that video images captured by the N cameras 20-$n$ can be time-synchronized.

FIG. 2 illustrates multi-viewpoint camera inputs, indicating screens showing images I(n,c) at synchronized time c of the video images captured by the multi-viewpoint cameras of FIG. 1.

FIG. 3 is a drawing for explaining labels for images of respective cameras. Cam$n$ is a label indicating the $n^{th}$ camera, Num$c$ means an image at the time c, I(n,c) represents an image at the time c of the camera n, and Cam$n$ Num$c$ represents the label thereof.

FIG. 4 illustrates an example of an image in which the skeleton of a subject in an image to which a label is applied is estimated, and the estimation result is superimposed. For example, as a technique of estimating the skeleton of a person from an image, Non-Patent Literature 2 is known. In this example, with respect to the subject, a person number (in this example, 1) indicating that it is a wraparound candidate of a wraparound video image and a frame 502 surrounding the candidate are shown. Here, as skeleton information, • showing each of a face 503, under head 504, belly 505, right ankle 506, and left ankle 507 is illustrated, whereby position information of each site can be obtained.

Moreover, a study has been made on analysis of similar image regions (for example, see Non-Patent Literature 3). On the basis of similar image regions, it is possible to determine that a subject captured by a camera 20-$n$ corresponds to which image region of another image captured by another camera 20-$n'$ ($n'$=1, 2, . . . N, where $n'\neq n$). This means that a subject existing in N images can be identified.

In the conventional art, a wraparound video image at a certain time is obtained by switching images at the certain time of video images captured by N cameras arranged to surround the subject, along the sequence of the cameras.

CITATION LIST

Non-Patent Literature

Non-Patent Literature 1: IKEYA Kensuke, et al., "Image Expression Using Multiple Robot Camera System", NHK, The Journal of The Institute of Image Information and Television Engineers 2012, Vol. 2012, Page. 21-1

Non-Patent Literature 2: Zhe Cao and Tomas Simon and Shih-En Wei and Yaser Sheikh, "Realtime Multi-Person 2D Pose Estimation using Part Affinity Fields", CVPR, 2017.

Non-Patent Literature 3: Masahiro TADA, et al. "Visual KANSEI Modeling Based on Focal Area Analysis and Hierarchical Classification", The Transactions of the Institute of Electronics, Information and Communication Engineers, D-II, Information and Systems, Pt. 2, D-II 87(10), 1983-1995, 2004 Oct. 1

SUMMARY OF THE INVENTION

Technical Problem

However, even in the case of arranging a plurality of cameras and estimating the skeleton of a person to recognize the person by Non-Patent Literature 2 or identifying a subject by using Non-Patent Literature 3, complete position information of the subject is not obtained due to various conditions. Therefore, misrecognition or missing information occurs. If a rotated video image is composed based on the misrecognition or missing information, the position of the subject moves up, down, right, and left, so that continuity will be lost, and the video image cannot be viewed comfortably. Hereinafter, more detailed description will be provided with reference to FIG. 5. FIG. 5 illustrates exemplary images on each of which a frame and the number indicating a candidate are superimposed around a candidate subject, at time c of the video images captured by the cameras 20-$n$. It can be seen that candidate persons 1 and 2 for two subjects are shown. An image I(2,c) shows an example of misrecognition in recognition of person's skeleton in which the persons are recognized by being switched from each other. An image I(4,c) shows an example of non-recognition in which a person is not recognized. In this way, in recognition of person's skeleton, misrecognition or missing information may occur.

Moreover, even though correct position information of a subject can be obtained by a plurality of cameras, there is a case where the sizes of the subject in images at a certain time in the video images captured by a plurality of cameras are not uniform and the sizes of the subject varies, which causes a lack of continuity so that a rotated composite video image may not be viewed comfortably.

An object of the present invention is to provide a video image editing device, a method thereof, and a program, capable of editing a wraparound video image, generated using a plurality of video images captured by multi-viewpoint cameras, to be comfortably viewed by viewers.

Means for Solving the Problem

In order to solve the problem described above, according to one aspect of the present invention, a video image editing device obtains a wraparound video image by switching video images captured by N photographing devices where N is an integer of 3 or larger, the photographing devices being arranged so as to surround a subject, the video images being switched along the sequence of the photographing devices, the wraparound video image being a video image as if it was captured by photographing devices going around the subject. The video image editing device includes a label application unit that applies, to each of images obtained from the N photographing devices, a label indicating a photographing device and a label indicating time; a position and size extraction unit that extracts a combination of information about the position and information about the size of the subject existing in an image to which the labels are applied; a position and size determination unit that generates a polynomial expression regarding the position of the subject and a polynomial expression regarding the size of the subject, based on information about positions and sizes of N subjects, performs correction or interpolation of the positions of the N subjects by a polynomial approximation curve using the polynomial expression regarding the position of the subject, performs correction or interpolation of the sizes of the N subjects by a polynomial approximation curve using the polynomial expression regarding the size of the subject, and expands or contracts the sizes of the N subjects using an expansion/contraction parameter p; an image cutout unit that cuts out, from the N images to which the labels are applied, a cutout range based on the positions and the sizes of the N subjects that were corrected or interpolated and expanded or contracted; an image size adjustment unit that converts the sizes of the N images that are cut out, into a same size; and a video image editing unit that generates an intermediate image from two images of the same size corresponding to the photographing devices adjacent to each other and generates a wraparound video image, with a parameter indicating a length of the wraparound video image being represented by Tp.

Effects of the Invention

The present invention has an advantageous effect that a wraparound video image generated using a plurality of video images captured by multi-viewpoint cameras can be edited to be comfortably viewable by viewers.

BRIEF DESCRIPTION OF DRAWINGS

FIG. 9A illustrates output images of an image size adjustment unit for the candidate person 1, that is, N cutout images whose sizes are normalized being aligned, and FIG. 9B illustrates output images of the image size adjustment unit for the candidate person 2, that is, N cutout images whose sizes are normalized being aligned.

FIG. 14 illustrates an example of a process flow by a position and size determination unit according to the first embodiment.

DESCRIPTION OF EMBODIMENTS

Figure 1:
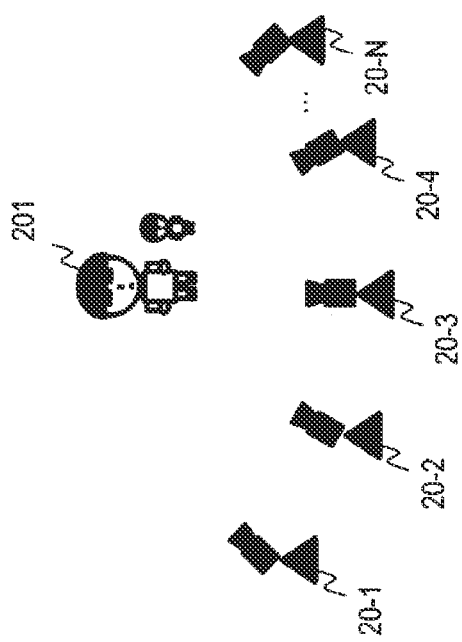
FIG. 1 illustrates an exemplary arrangement of multi-viewpoint cameras.
Figure 2:
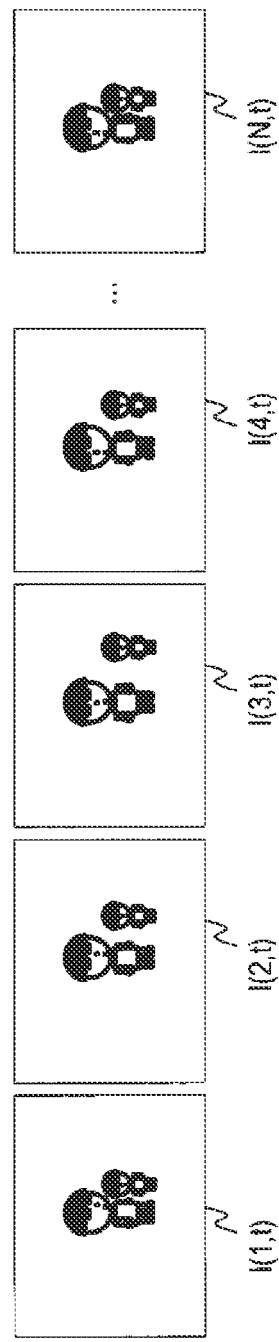
FIG. 2 illustrates exemplary inputs of multi-viewpoint cameras.

Hereinafter, an embodiment of the present invention will be described. Note that in the drawings used in the description provided below, components having the same function and steps for the same process are denoted by the same reference signs and the overlapping description is omitted. In the description provided below, a sign "^" or the like used in the text, should be described immediately above the previous character, but is described immediately after the character due to the limitation of the text notation. In the expressions, such signs are described at original positions. Moreover, it is assumed that a process performed for each element unit such as a vector or a matrix is applied to all elements of the vector or the matrix unless otherwise indicated.

Hereinafter, points of the respective embodiments will be described.

Point of First Embodiment

In a first embodiment, in order to cope with misrecognition and missing information, correction or interpolation of positions and sizes of N subjects by a polynomial approximation curve using polynomial expressions related to the position and the size of the subject (a specific example is shown in point 1 of second embodiment).

With an expansion/contraction parameter p, the sizes of the N subjects that are corrected or interpolated are expanded or contracted (a specific example is shown in point 2 of second embodiment).

Moreover, from two images of the same size corresponding to photographing devices adjacent to each other, an intermediate image is generated, and a wraparound video image having a length Tp is generated (a specific example is shown in point of third embodiment).

Point 1 of Second Embodiment

FIG. 6 is a diagram for explaining correction and interpolation of information by a polynomial approximation curve. Note that in a second embodiment, in order to perform correction and interpolation by a polynomial approximation curve, N is any of an integer of 3 or larger.

Figure 6B:
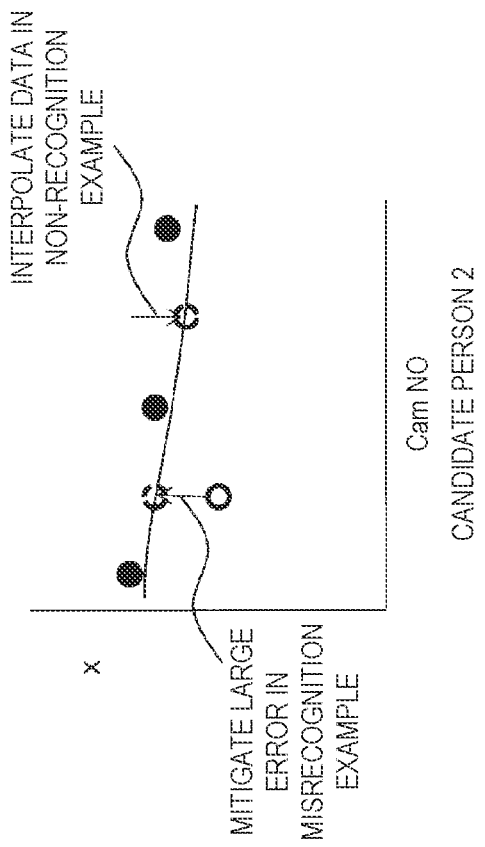
FIG. 6B illustrates an exemplary relationship between the Cam No. (horizontal axis) and the X value (vertical axis) of a candidate person 2.
Figure 6A:
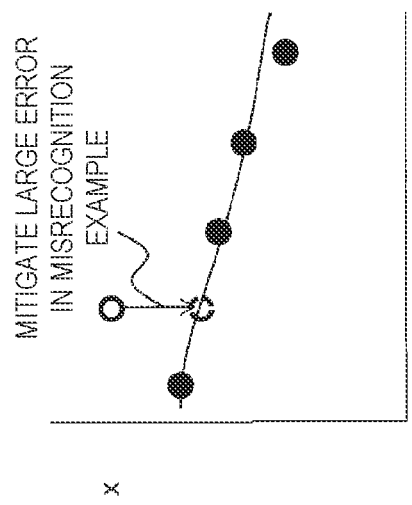
FIG. 6A illustrates an exemplary relationship between the Cam No. (horizontal axis) and the X value (vertical axis) of a candidate person 1.

FIGS. 6A and 6B illustrate exemplary relationships between the Cam No. (horizontal axis) and the X value (vertical axis) for candidate persons 1 and 2 respectively. Note that the Cam No. corresponds to the sequence of the cameras. Therefore, a camera 20-$n$ corresponding to Cam$n$ and a camera 20-$n$+1 corresponding to Cam$n$+1 are adjacent to each other.

First, on the basis of N pieces of information related to the position of the person 1, a polynomial expression (approximate expression) regarding the position (X value) of the person 1 is generated. Note that in the case where information is missing, a polynomial expression may be generated using only the remaining information that, is not missing. Alternatively, instead of the missing information, a polynomial expression may be generated using (1) an average of the remaining information that is not missing, (2) out of the information not missing, information corresponding to a camera disposed at a position physically closest to the camera corresponding to the missing information (when there are a plurality of pieces of information, an average thereof, for example, when no information corresponding to the adjacent cameras is missing, an average thereof), or the like.

In the figures, ● indicates data in which an error (difference between observed value and real value) is extremely small, ○ represents data in which an error is large, and ○ with a broken line represents data that is corrected or interpolated. As an observed value, a value obtained as a result of recognizing the skeleton of a person is used, and as a real value, a value on a polynomial expression (approximated expression) is used. For example, when the error rate (error/real value) is smaller than a predetermined threshold (or equal to or smaller than the threshold), the data is determined to have an extremely small error, and when the error rate is equal to or larger than the predetermined threshold (or larger than the threshold), the data is determined to have a large error.

In the second embodiment, when the data is determined to have a large error, the data having a large error is corrected by a polynomial approximation curve to mitigate the large error of the misrecognition example. For example, data having a large error is corrected by being converted to a value on the approximate expression. Thereby, it is shown that a large error in the misrecognition example can be mitigated.

Moreover, in the second embodiment, when the information is missing, the missing information is interpolated by being replaced with a value of the approximate expression. FIG. 6B shows that data of the non-recognition example can be interpolated.

While FIG. 6 illustrates an example in which the vertical axis shows the X value, it is also possible to correct or Interpolate the Y value and the size by the same method.

Point 2 of Second Embodiment

Figure 4:
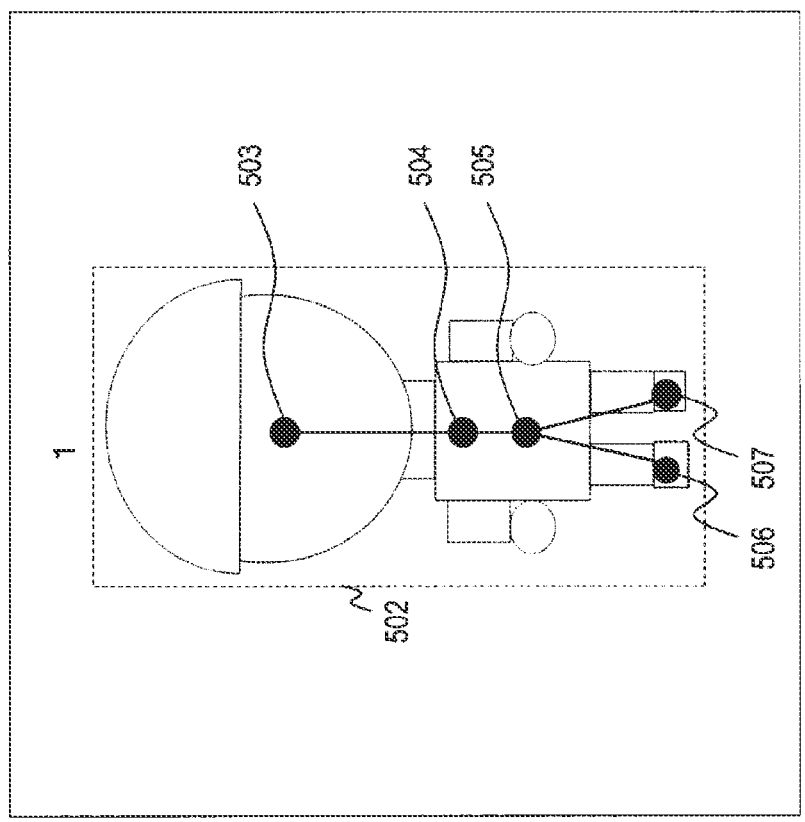
FIG. 4 illustrates an exemplary image in which the skeleton of a subject in an image to which a label is applied is estimated and the estimation result is superimposed.

A problem that a rotated composite video image cannot be viewed comfortably is solved by performing processing to adjust the size of a person using the skeleton estimation result in FIG. 4 to make the size not to be too big or too small.

FIG. 7 is an example of a magnification parameter $p_n$ for designating the cutout size of an image. Here, $G=(1+n)/2$ $G_2=N-G$ $p_n=p-(p-1)\times\{(n-G)/G_2^2\}$ are established. p represents an expansion/contraction parameter, and is a predetermined value. For example, it may be a value designated by a user, or may be any initial value.

The magnification parameter $p_n$ is a magnification parameter for expansion and contraction. In the second embodiment, expansion and contraction are controlled by creating the magnification parameter $p_n$ by a quadratic curve as illustrated in FIG. 7 with use of the parameters p, G, and $G_2$ described above. As is understood from the expression, $p_n$ is created by a quadratic curve so as to become p at a maximum value or a minimum value.

Figure 7A:
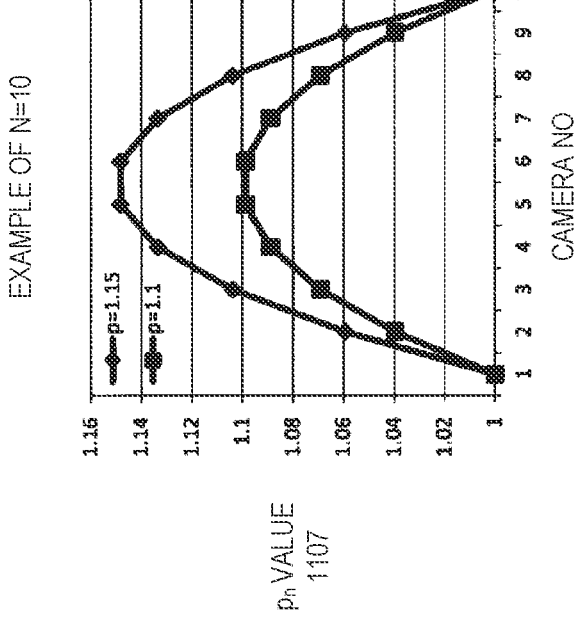
FIG. 7A illustrates an example of a magnification parameter $p_n$ where N=5.
Figure 7B:
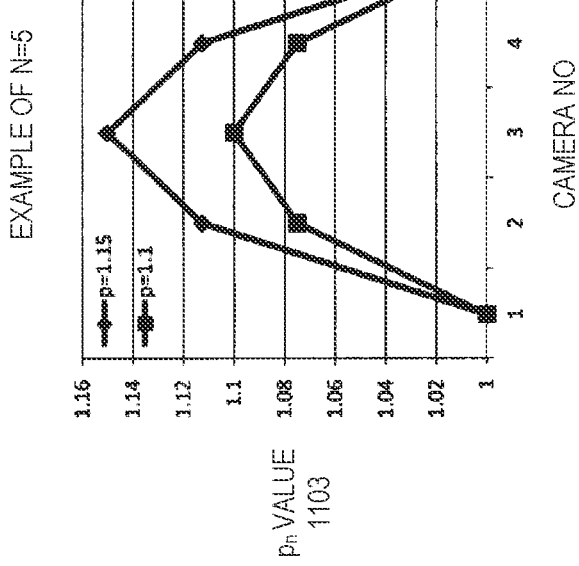
FIG. 7B illustrates an example of a magnification parameter $p_n$ where N=10.

FIGS. 7A and 7B illustrate examples where N=5 and N=10, respectively. In each of the figures, the horizontal axis shows the camera No. and the vertical axis shows the $p_n$ value. $p_n$ values where p=1.15 and p=1.1 are shown.

Figure 8:
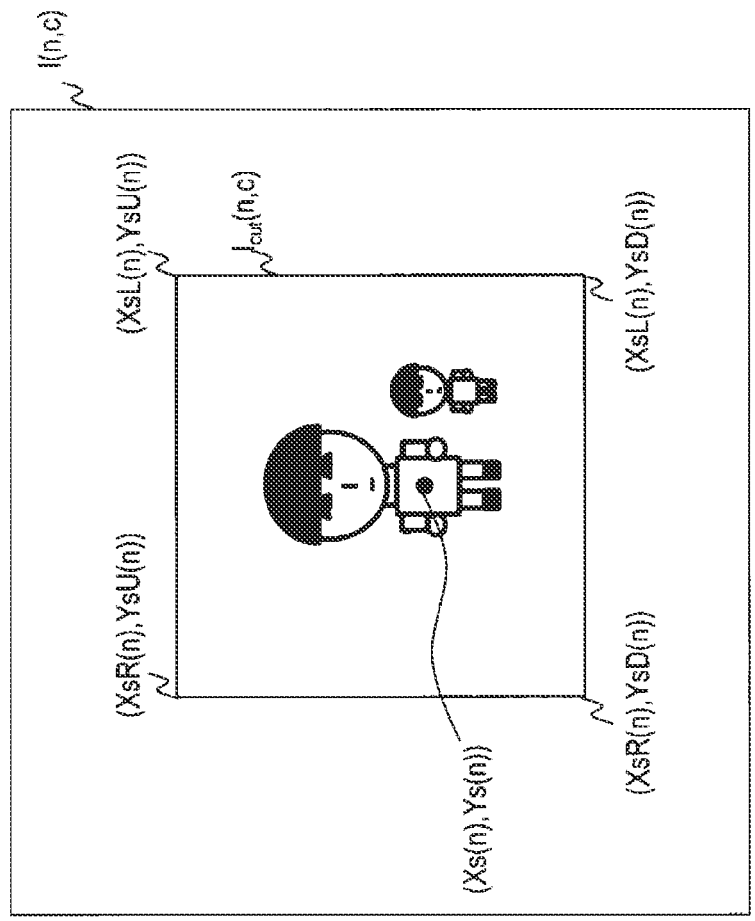
FIG. 8 is a drawing for explaining the content of image cutout processing.

FIG. 8 is an illustration for explaining the content of an image cutout process.

From N images I(n,c) to which labels Cam$n$ Num$c$ (n=1, 2, . . . , N) are applied, a subject is cut out in a cutout range, whereby N output images $I_{cut}$(n,c) of Num$c$ are obtained.

In the image I(n,c), as the center of the subject, a center X coordinate value Xs(n) that is corrected or interpolated and a center Y coordinate value Ys(n) that is corrected or interpolated are used.

The cutout image $I_{cut}$(n,c) is defined by an upper right value (XsR(n),YsU(n)), an upper left value (XsL(n),YsU(n)), a lower right value (XsR(n),YsD(n)), and a lower left value (XsL(n),YsD(n)), with the center X coordinate value Xs(n) that is corrected or interpolated and the center Y coordinate value Ys(n) that is corrected or interpolated being the center. Note that when Ls(n) represents the corrected or interpolated size, {(XsR(n),YsU(n)), (XsL(n),YsU(n)), (XsR(n),YsD(n)), (XsL(n),YsD(n))}
={(Xs(n)−a×Ls(n)×$p_n$,Ys(n)−b×Ls(n)×$p_n$),
(Xs(n)+a×Ls(n)×$p_n$,Ys(n)−b×Ls(n)×$p_n$),
(Xs(n)−a×Ls(n)×$p_n$,Ys(n)+b×Ls(n)×$p_n$),
(Xs(n)+a×Ls(n)×$p_n$,Ys(n)+b×Ls(n)×$p_n$)} is established. Here, a and b represent parameters specifying the aspect ratio, and when they are 2 and 1.5, respectively, an image of an aspect ratio of 4:3 can be obtained.

FIG. 9 illustrates images output from an image size adjustment unit described below in which the sizes of the N cutout images are normalized and the cutout images are aligned. Since they are normalized, the sizes of the target subjects become an appropriate size, which suppress irregularities when being rotated and provide continuity, whereby it can be viewed comfortably.

Figure 5:
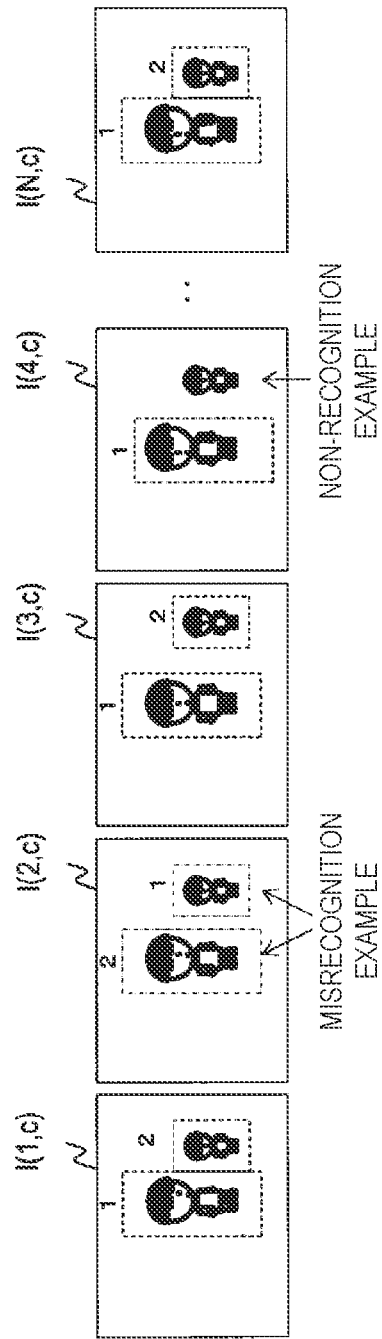
FIG. 5 illustrates exemplary images on each of which a frame and the number indicating a candidate are superimposed around the candidate subject, at time of video images captured by cameras.

FIG. 9A illustrates a cutout image of the candidate person 1 in FIG. 5, and FIG. 9B illustrates a cutout image of the candidate person 2 in FIG. 5.

In the cutout images $I_{cut}$(2,c) of FIGS. 9A and 9B, a large error in misrecognition is corrected.

In the cutout images $I_{cut}$(4,c) of FIG. 9B, data in non-recognition is interpolated.

Specifically, (1) A skeleton estimation result is obtained from each image, and the vertical size is obtained from the skeleton estimation result.

(2) The vertical size of the subject in each image is corrected or interpolated by polynomial approximation.

(3) To the corrected or interpolated vertical size, an expansion or contraction effect is applied.

(4) The size of the image to which an expansion or contraction effect is applied is normalized.

Note that by applying the expansion or contraction effect of (3), the following effects can be obtained.

As described above, processing to change the size of the subject to be an appropriate same size or to make it smooth is performed, to thereby suppress vibration as much as possible. However, since processing to display the subject to be in the same size is performed, when the subject is made into a rotated video image, size vibration of the subject (hereinafter referred to as size irregularity vibration) may be visible (not to be viewed comfortably). Since such a case may happen, by applying an expansion or contraction effect to change the size of the subject, an attempt is made to suppress visible irregularity vibration (so as to be viewed comfortably) when the subject is made into a rotated video image.

As described above, by applying an approximate expression for an error or missing information in the skeleton estimation result, processing to reduce the misrecognition (correction processing), processing to interpolate missing information, and processing to size adjustment of a subject and expansion or contraction processing are performed to thereby change the expansion/contraction rate of the cutout image. Thereby, the rotated composite video image is edited to be viewed comfortably.

Point of Third Embodiment

From a cutout image obtained from a camera and a cutout image obtained from another camera adjacent thereto, an intermediate image is generated, and a video image is generated from the intermediate image, to thereby further reduce discomfort feeling by the viewers.

Tp represents a parameter indicating the length (time length) of a wraparound video image. An intermediate image I(t) between the n+1$^{th}$ image I(n+1,c') and the n$^{th}$ image I(n,c') at time t of the wraparound video image is calculated from the following expressions:

$$B(n+1,t)=1/[1+\mathrm{Exp}[Ng\times\{Tc\times(n-0.5)-t\}/Tc]]$$

$$B(n,t)=1-B(n+1,t)$$

$$I(t)=I(n+1,c')\times B(n+1,t)+I(n,c')\times B(n,t)$$

where $Tc=Tp/(N-1)$ $$t=Tc\times(n-1)+1,\ldots,Tc\times n$$

provided that n=1, 2, ..., N−1. As an example, Ng=9.

Note that the image I(n+1,c') and the image I(n,c') are obtained by normalizing (converted into the same size) those cut out in a cutout range based on the position and the size of the subject that is corrected or interpolated and expanded or contracted. The index c' indicating the time represents any synchronization time of a video image captured by a multi-viewpoint camera, and c'=1, 2, ..., or Z. In the third embodiment, from N images I(n,c') at the time c' of N video images, a wraparound video image at the time Tp is generated. t represent an index indicating the time of the wraparound video image.

Figure 10:
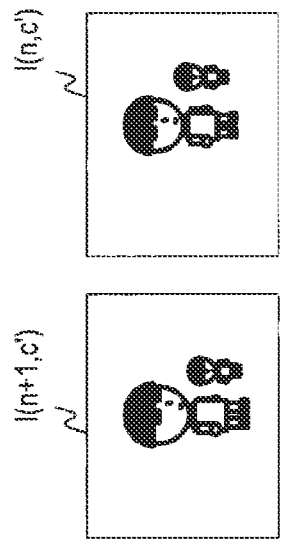
FIG. 10 illustrates two exemplary images corresponding to cameras adjacent to each other.
Figure 11:
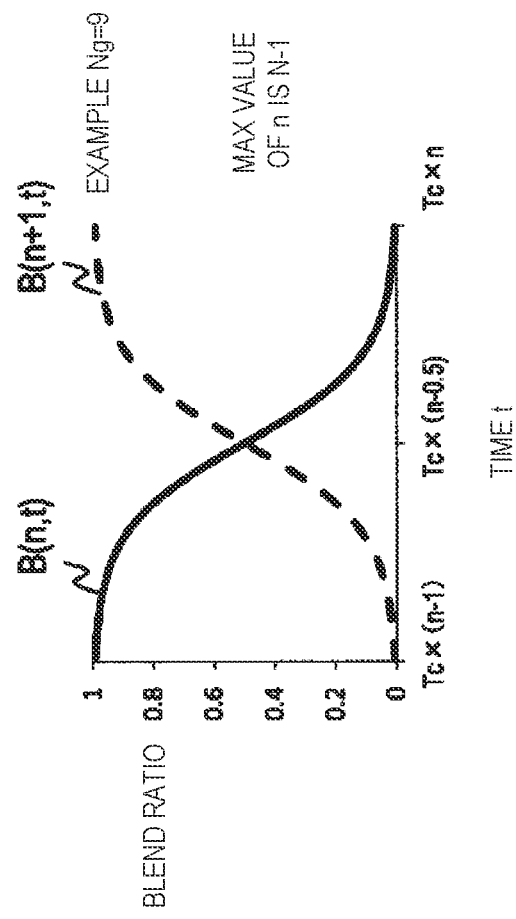
FIG. 11 illustrates a relationship between blend ratios B(n+1,t) and B(n,t) and t.

FIG. 10 illustrates examples of the image I(n+1,c') and the image I(n,c'), and FIG. 11 illustrates a relationship between blend rates B(n+1,t) and B(n,t) and t. On the horizontal axis, the right end indicates the time t=Tc×(n−1), the left end indicates the time t=Tc×n (that is, t=Tc×(n−1), ..., Tc×n), and the intermediate indicates the time t=Tc×(n−0.5). In this example, when Ng=9, and the maximum value of n is N−1 (that is, when n=1, 2, ..., N−1), curve lines of the blend rates B(n+1,t) (broken line) and B(n,t) (solid line) with the image I(n+1,c') and the image I(n,c') are shown.

As described above, by composing an intermediate image between cameras on the basis of a variable time parameter Tp, it is possible to compose a viewpoint moving video image between cameras.

First Embodiment

Figure 12:
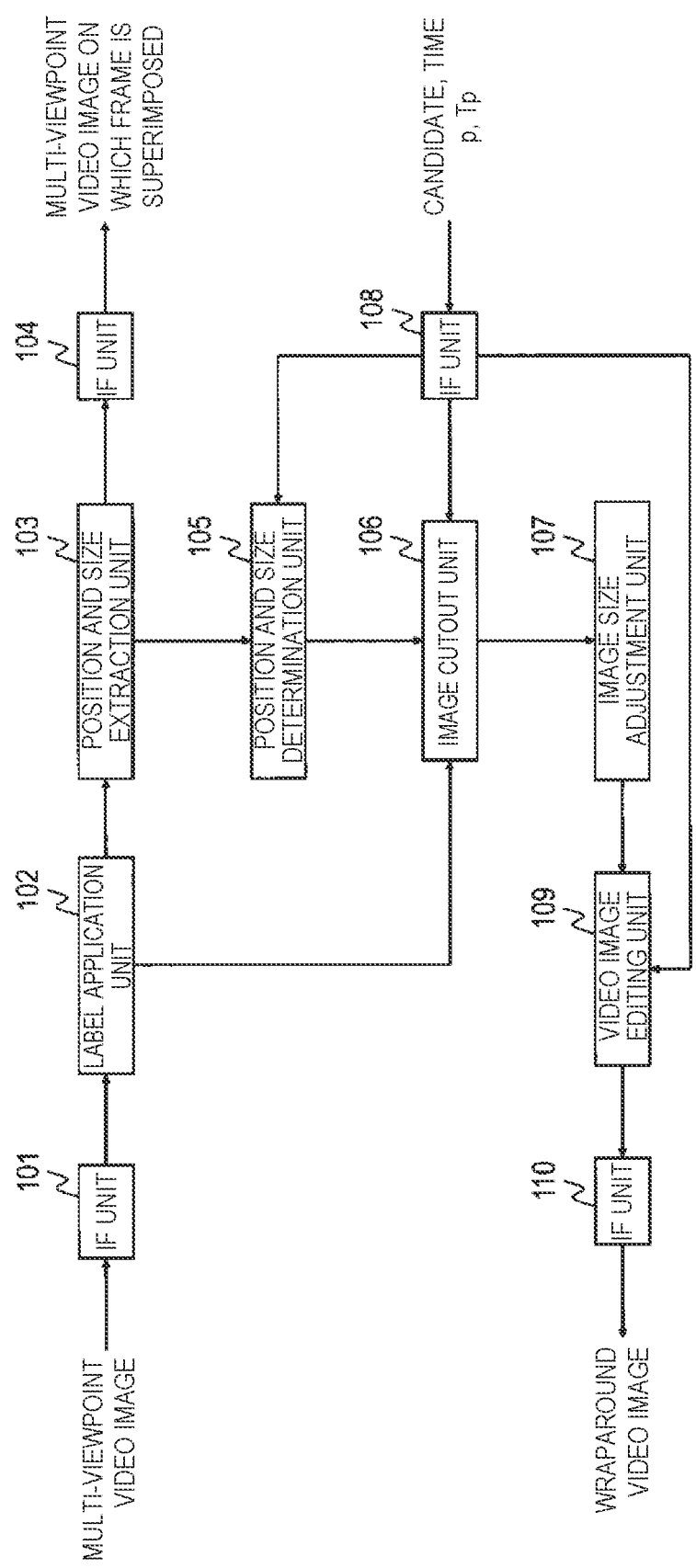
FIG. 12 is a function block diagram of a video image editing device according to a first embodiment.
Figure 13:
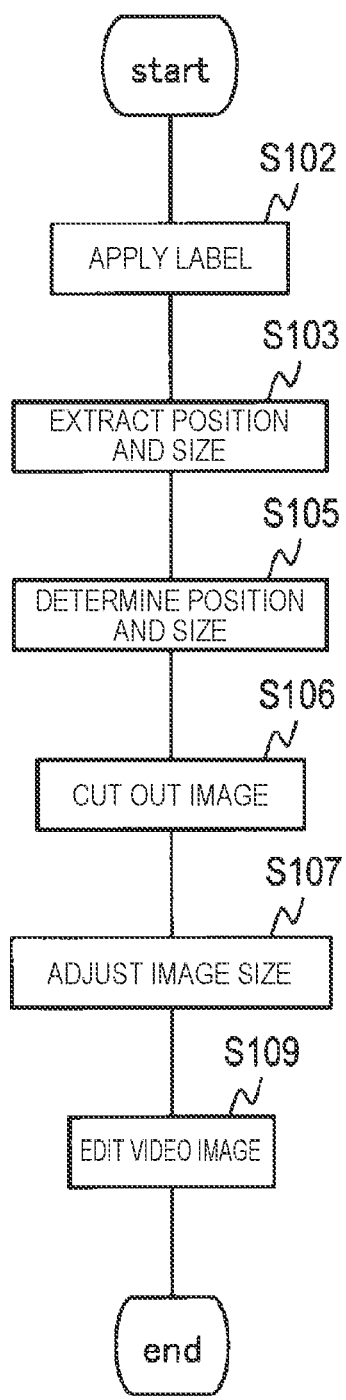
FIG. 13 illustrates an example of a process flow by the video image editing device according to the first embodiment.

FIG. 12 illustrates a function block diagram of a video image editing device according to the first embodiment, and FIG. 13 illustrates the processing flow thereof.

The video image editing device includes an IF unit 101, a label application unit 102, a position and size extraction unit 103, an IF unit 104, a position and size determination unit 105, an image cutout unit 106, an image size adjustment unit 107, an IF unit 108, a video image editing unit 109, and an IF unit 110.

The video image editing device receives N video images (multi-viewpoint video images) as inputs, and outputs N video images on each of which a frame (see FIG. 4) surrounding a wraparound candidate of a wraparound video image is superimposed. A user viewing the N video images on each which a frame is superimposed designates any of the candidates, the time of N images serving as the sources of a wraparound video image, and an expansion/contraction parameter p and a parameter Tp indicating the length of the wraparound video image, and inputs them to the video image editing device. For example, on an output device such as a display or a touch panel, N video images on each of which a frame is superimposed are displayed, and a user designates a candidate displayed on any of the N video images with use of an input device such as a mouse, a touch panel, or a keyboard. The designated timing is used as the time of the N images serving as the sources of the wraparound video image. The user may first designate the time (the time of the N images serving as the sources of a wraparound video image) with use of an input device, allow the N images on each of which a frame is superimposed corresponding to the time to be displayed on an output device, and designate a displayed candidate with use of an input device. That is, it is only necessary to display any video images or images so as to allow the user to designate the time of the N images serving as the sources of the wraparound video image, candidates, the expansion/contraction parameter p, and the parameter Tp indicating the length of the wraparound video image, and allow the user to obtain designated information.

The video image editing device receives the designated candidate, the time, the expansion/contraction parameter p, and the parameter Tp as inputs, and generates and outputs a wraparound video image having the length Tp corresponding to the designated candidate, time, and expansion/contraction parameter p.

Note that the N video images (multi-viewpoint video images) are not limited to those directly input from photographing devices such as cameras. It is possible to use those stored in a storage medium or those stored in a storage unit in the video image editing device.

The video image editing device is a special device configured such that a special program is read in a publicly-known or dedicated computer having a central processing unit (CPU), a random access memory (RAM), and the like. The video image editing device executes respective processes under control of the CPU. Data input to the video image editing device and data obtained in respective processes are stored in the RAM for example, and the data stored in the RAM is read to the CPU as required and is used for another process. At least part of each of the processing unit of the video image editing device may be configured of hardware such as an integrated circuit. Each storage unit provided to the video image editing device can be configured of a main memory such as a random Access Memory (RAM), or middleware such as a relational database or a key value store. However, each storage unit is not necessarily provided in the video image editing device. It may be configured of an auxiliary storage unit such as a hard disk, an optical disk, or a semiconductor memory element such as a flash memory, and may be provided outside the video image editing device.

Hereinafter, each unit will be described.

IF Unit 101

The IF unit 101 receives N video images (multi-viewpoint video images) as inputs, and outputs synchronized N video images.

Label Application Unit 102

Figure 3:
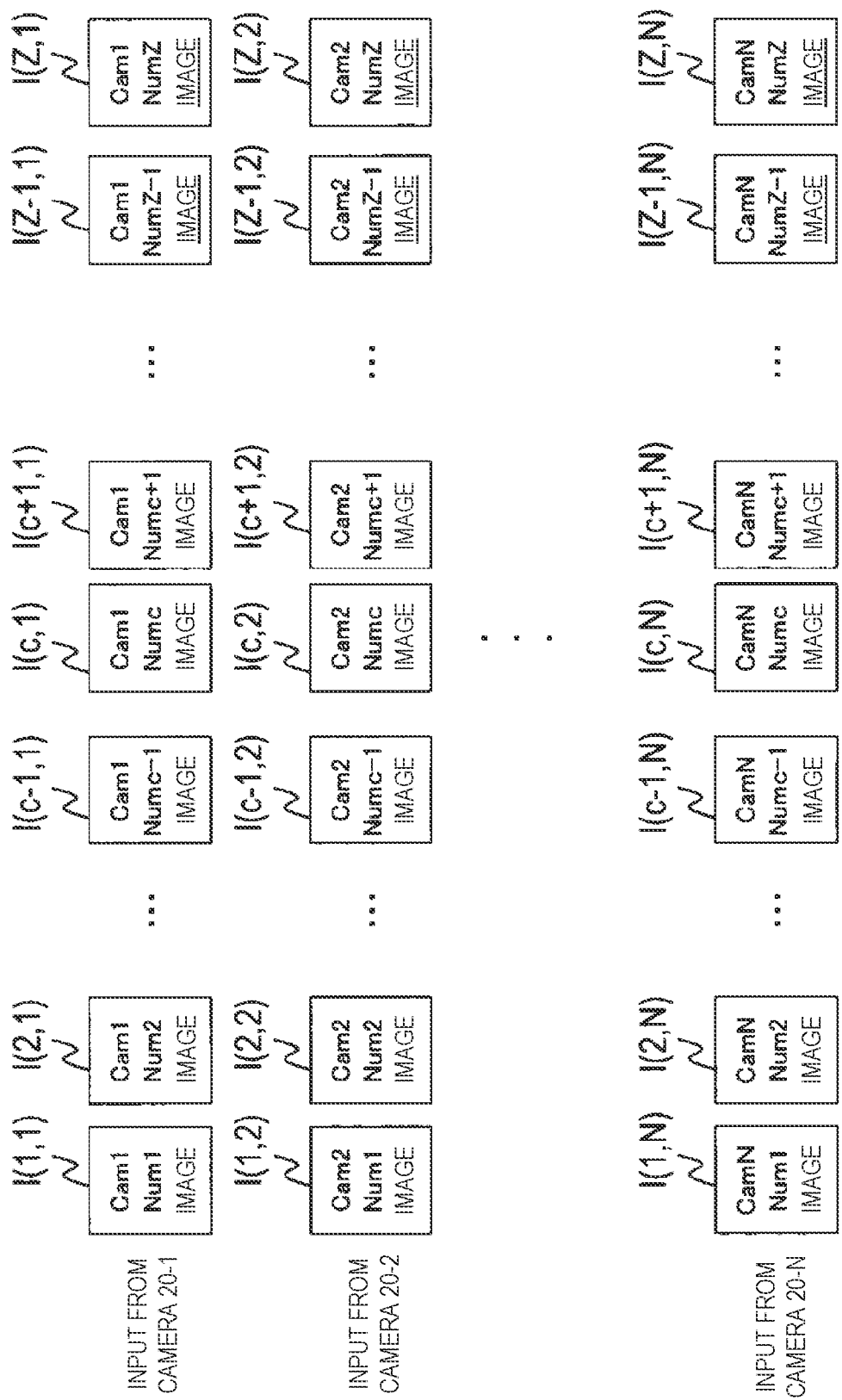
FIG. 3 is a drawing for explaining labels for images of respective cameras.

The label application unit 102 receives the synchronized N video images as inputs, applies a label indicating a photographing device and a label indicating the time to each of the images configuring the synchronized N video images (S102, see FIG. 3), and outputs labeled images I(n,c). In the case where each video image is formed of z images, the label application unit 102 outputs N×Z images I(n,c) by applying labels showing the photographing devices and labels showing the time. Note that it is assumed that the photographing devices that captured the N video images are arranged so as to surround the subject, and that the sequence of the photographing devices is known in advance.

Position and Size Extraction Unit 103

The position and size extraction unit 103 receives the labeled images I(n,c) as inputs, extracts a combination (I(n,c),m,info(m)) of an index m indicating a candidate subject existing in the labeled image and information info (m) regarding the position and the size of the candidate subject (S103), outputs, to the IF unit 104, an image I'(n,c) in which a frame surrounding the candidate subject is superimposed on the labeled image, and outputs, to the position and size determination unit 105, the combination (n,c,m,info(m)) of the index showing the candidate subject and the information regarding the position and the size of the candidate subject. In the case where each of the N×Z images includes M candidate subjects, the position and size extraction unit 103 extracts a combination (n,c,m,info(m)) of indexes showing N×Z×M candidate subjects and the information regarding the positions and the sizes of the candidate subjects. Note that in the case where the subject does not exist in an image temporarily, information showing that the subject does not exist may be used as information regarding the position and the size.

Note that as a technique of detecting a predetermined target (for example, human being) from an image and superimposing a frame on the detected target, any image recognition (person recognition) technique may be used. When a frame is displayed, it means that a candidate subject can be recognized, and when a frame is not displayed, it means that a candidate subject cannot be recognized.

As a method of acquiring information regarding the position and the size of a candidate subject, any acquisition method may be used. For example, it is possible to use the method of Non-Patent Literature 2 to estimate the skeleton of a candidate subject existing in the image, and use the estimation result (skeleton estimation result) as information regarding the position and the size of the candidate.

In the case of identifying one or more candidate subjects existing in the N images and applying an index indicating a candidate subject to each of them, any identifying method may be used. For example, it is possible to use Non-Patent Literature 3 to identify the subject existing in the N images.

IF Unit 104

The IF unit 104 receives an image I'(n,c) in which a frame surrounding a candidate subject is superimposed on the labeled image (see FIG. 4) as an input, and outputs it to an external output device.

As described above, in order to allow a user to designate the time of the N images serving as the sources of a wraparound video image, candidates, the expansion/contraction parameter p, and the parameter Tp indicating the length of the wraparound video image, some video images and images are displayed to the user via the output device.

IF Unit 108

The IF unit 108 receives the candidates, the time, the expansion/contraction parameter p, and the parameter Tp that are designated by the user as inputs, and outputs the designated candidates, time, and expansion/contraction parameter p to the position and size determination unit 105. The IF unit 108 also outputs the designated time to the image cutout unit 106, and outputs the parameter Tp to the video image editing unit 109. Note that if a candidate is not designated or the expansion/contraction parameter p or the parameter Tp is not input, the previously used values, the initial values, or the like may be used as designated candidates, expansion/contraction parameter p, or parameter Tp.

Position and Size Determination Unit 105

The position and size determination unit 105 receives a combination of an index indicating a candidate subject and information regarding the position and the size of the candidate subject, and the designated candidate, time, and expansion/contraction parameter p, as inputs.

First, the position and size determination unit 105 extracts, from among the combinations (n,c,m,info(m)) of the indexes indicating candidate subjects and information regarding the position and the size of the candidate subjects, a combination (n,c',m',info(m')) corresponding to the designated candidate and the time. c' represents an index of the designated time, and m' represents an index of the designated candidate. For example, in the case of receiving a combination of indexes indicating N×Z×M candidate subjects and information regarding the positions and the sizes of the candidate subjects as inputs, from among the N×Z×M combinations (n,c,m,info(m)), the position and size determination unit 105 extracts N pieces of information (n,c',m', info(m')) regarding the positions and the sizes of the subject designated by the designated candidate subjects (hereinafter, a designated candidate subject is also simply referred to as a subject) and the time.

The position and size determination unit 105 obtains the positions and the sizes {Xs(n),Ys(n),size(n)} of the N subjects that are corrected or interpolated and expanded or contracted from the information (n,c',m',info(m')) regarding the positions and the sizes of the N subjects (S105), and outputs a cutout range {(XsR(n),YsU(n)),(XsL(n),YsU(n)), (XsR(n),YsD(n)),(XsL(n), YsD(n))} based on the positions and the sizes of the N subjects that are corrected or interpolated and expanded or contracted. Specifically, it is calculated as described below.

The position and size determination unit 105 generates a polynomial expression regarding the position of the subject and a polynomial expression regarding the size of the subject, based on the information regarding the positions and the sizes of the N subjects.

The position and size determination unit 105 performs correction or interpolation of the positions of the N subjects by a polynomial approximation curve using the polynomial expression regarding the position of the subject.

The position and size determination unit 105 performs correction or interpolation of the sizes of the N subjects by the polynomial approximation curve using the polynomial expression regarding the size of the subject to thereby expand or contract the sizes of the N subjects with the expansion/contract parameter p.

Image Cutout Unit 106

The image cutout unit 106 receives the designated time c', N×Z labeled images I(n,c), and N cutout ranges {(XsR(n),YsU(n)),(XsL(n),YsU(n)),(XsR(n),YsD(n)),(XsL (n), YsD(n))}, as inputs.

First, from among the labeled images I(n,c), the image cutout unit 106 extracts N images I(n,c') corresponding to the designated time c'. From the N images I(n,c'), the image cutout unit 106 cuts out N cutout ranges {(XsR(n),YsU(n)), (XsL(n),YsU(n)), (XsR(n),YsD(n)), (XsL(n),YsD(n))} respectively (S106), and outputs N cutout images $I_{cut}$(n,c').

Image Size Adjustment Unit 107

The image size adjustment unit 107 receives N cutout images $I_{cut}$(n,c') as inputs, converts the sizes of the N images $I_{cut}$(n,c') to be the same size (S107), and outputs the N cutout images $I_{st}$(n,c') in which the sizes thereof are converted to be the same.

Video Image Editing Unit 109

The video image editing unit 109 receives the parameter Tp and the N cutout images $I_{st}$(n,c') converted to be the same size as inputs, generates an intermediate image I(t) from two images $I_{st}$(n+1,c') and $I_{st}$(n,c') of the same size corresponding to photographing devices adjacent to each other, generates a wraparound video image having the length Tp, based on the intermediate image (t) (S109), and outputs it, provided that Tc=Tp/(N−1).

IF Unit 110

The IF unit 110 receives the wraparound video image as an input, and outputs the wraparound video image to an external output device.

Effects

With the configurations described above, a wraparound video image generated using a plurality of video images captured by multi-viewpoint cameras can be edited to be comfortably viewable by viewers.

In more detail, by performing correction or interpolation of the positions of the N subjects by a polynomial approximation curve using a polynomial expression regarding the position of the subject, a problem that the position of the subject moves up, down, left, and right, which deteriorates continuity and causes uncomfortableness in viewing, is solved.

Moreover, by performing correction or interpolation of the sizes of the N subjects by a polynomial approximation curve using a polynomial expression regarding the size of the subject to expand or contract the sizes of the N subjects by the expansion/contraction parameter p, a problem that the size of the subject varies, which deteriorates continuity and causes uncomfortableness in viewing the rotated composite video image, is solved.

Furthermore, by generating an intermediate image from two images of the same size corresponding to photographing devices adjacent to each other, and generating a wraparound video image having the length Tp, it is possible to smoothly link the two images of the same size corresponding to the photographing devices adjacent to each other. While it is desirable that the value of the number of units N of the photographing means is large and the photographing means are closely arranged, in the present embodiment, since an intermediate image is generated, it is possible to smoothly link the images even if the value of N is relatively small (for example, N=5).

Modification

The present embodiment has a configuration that one or more candidate subjects exist in N video images and one subject is designated from among them. However, in the case where only one candidate subject exists in the N video images, the candidate subject may be handled as the subject and the processes and configurations for designating the subject may be omitted.

Second Embodiment

Description will be given mainly on part different from the first embodiment.

In the present embodiment, an example of a specific process performed by the position and size determination unit 105 will be described with reference to FIG. 14.

In the present embodiment, a skeleton estimation result is used as information regarding the position and the size of a subject.

A process performed by the position and size determination unit 105 up to extraction of a combination corresponding to the designated candidate and time, from among the combinations of the indexes indicating candidate subjects and information regarding the position and the size of the subject, is the same as that of the first embodiment. Thereafter, in the second embodiment, the position and size determination unit 105 obtains, from the skeleton estimation information of the subject of FIG. 4 that is information regarding the position and the size of the subject, coordinates values of the face 503, the belly 505, the right ankle 506, and the left ankle 507, that is, $(X_{face}(n), Y_{face}(n))$, $(X_{belly}(n), Y_{belly}(n))$, $(X_{Rankle}(n), Y_{Rankle}(n))$, and $(X_{Lankle}(n), Y_{Lankle}(n))$. Note that when information is missing, NULL may be obtained.

The position and size determination unit 105 obtains the vertical size Ysize(n) of the N subjects from the N skeleton estimation results according to the following expressions:

$Y1(n) = Y_{face}(n) - Y_{Rankle}(n)$ $Y2(n) = Y_{face}(n) - Y_{Lankle}(n)$ $Ysize(n) = (Y1(n) + Y2(n))/2$ Note that when information is missing, NULL may be obtained.

With the coordinate value $(X_{belly}(n), Y_{belly}(n))$ of the belly 505 being the position of the subject, the vertical size Ysize(n) is obtained and is acquired as the size of the subject (S901).

In the case where the sizes and the positions of three or more subjects cannot be obtained from information regarding the positions and the sizes of N subjects because of a large amount of missing information (NO at S902), it is determined that correction or interpolation by a polynomial approximation curve cannot be made, so that the process ends without editing a wraparound video image (S904).

In the case where the sizes and the positions of three or more subjects can be obtained (YES at S902), the process described in <Point 1 of Second Embodiment> is performed.

The position and size determination unit 105 generates a polynomial expression regarding the position of the subject, using the positions of the three or more subjects. Further, the position and size determination unit 105 performs correction or interpolation of the positions of the N subjects by a polynomial approximation curve using the polynomial expression regarding the position of the subject (S905).

For example, when a polynomial expression regarding the position of the subject is used, if there is an outlier larger than a threshold, the position of the outlier is replaced with a value obtained by the polynomial expression to perform correction (see FIG. 6). Moreover, when the position of the $n^{th}$ subject is missing, the missing position is replaced with a value obtained by the polynomial expression to perform interpolation (see FIG. 6B).

The position and size determination unit 105 generates a polynomial expression regarding the size of the subject, using the sizes of the three or more subjects. Further, the position and size determination unit 105 performs correction or interpolation of the sizes of the N subjects by a polynomial approximation curve using the polynomial expression regarding the size of the subject (S906).

For example, when a polynomial expression regarding the size of the subject is used, if there is an outlier larger than a threshold, the size of the outlier is replaced with a value obtained by the polynomial expression to perform correction. Moreover, when the size of the $n^{th}$ subject is missing, the missing size is replaced with a value obtained by the polynomial expression to perform interpolation.

Through the process described above, the position and the size of the subject that are corrected or interpolated are acquired. After the threshold determination or missing determination as described above there is a case where there is no outlier or missing so that correction or interpolation is not performed actually. Even in such a case, they are called position and size of the subject that is corrected or interpolated Next, when the expansion/contraction parameter p is designated (Yes in S1002), the position and size determination unit 105 performs S1004 described below (process described in <Point 2 of Second Embodiments>), while when the expansion/contraction parameter p is not designated (No in S1002), the position and size determination unit 105 performs S1005 described below.

S1005 (When Expansion/Contraction Parameter p is not Designated)

Assuming that the position of the corrected or interpolated subject is $(Xs(n), Ys(n))$ and the size of the corrected or interpolated subject is Ls(n), the cutout range is $\pm a \times Ls(n)$ in the X axis direction with respect to Xs(n) and $\pm b \times Ls(n)$ in the Y axis direction with respect to Ys(n). That is, the cutout range is obtained as $\{(Xs(n)-a \times Ls(n), Ys(n)-b \times Ls(n)), (Xs(n)+a \times Ls(n), Ys(n)-b \times Ls(n)), (Xs(n)-a \times Ls(n), Ys(n)+b \times Ls(n)), (Xs(n)+a \times Ls(n), Ys(n)+b \times Ls(n))\}$.

S1004 (When Expansion/Contraction Parameter p is Designated)

The sizes of the N subjects that are corrected or interpolated by the expansion/contraction parameter p is expanded or contracted. For example, the process described in the point 2 of the second embodiment is performed, and with use of the expansion/contraction parameter p, a magnification parameter $p_n$ of the N subjects is created by a quadratic curve, and the sizes of the N subjects is expanded or contracted. In more detail, the process described below is performed. First, $$G = (1+n)/2$$

$$G_2 = N - G$$

$$p_n = p - (p-1) \times \{(n-G)/G_2^2\}$$

are calculated. Based on the parameter $p_n$, the cutout range is set to be $\pm a \times Ls(n) \times p_n$ in the X axis direction with respect to Xs(n), and $\pm b \times Ls(n) \times p_n$ in the Y axis direction with respect to Ys(n). That is, the cutout range is obtained as $\{(Xs(n)-a \times Ls(n) \times p_n, Ys(n)-b \times Ls(n) \times p_n), (Xs(n)+a \times Ls(n) \times p_n, Ys(n)-b \times Ls(n) \times p_n), (Xs(n)-a \times Ls(n) \times p_n, Ys(n)+b \times Ls(n) \times p_n), (Xs(n)+a \times Ls(n) \times p_n, Ys(n)+b \times Ls(n) \times p_n)\}$. Note that to the viewers, as $p_n$ is larger, the cutout range is larger so that the ratio of the subject in the cutout image is smaller and it is viewed as being contracted, while as $p_n$ is smaller, the cutout range is smaller so that the ratio of the subject in the cutout image is larger and it is viewed as being expanded.

Modification

The present embodiment shows an example in which the cutout range is obtained as $\{(Xs(n)-a \times Ls(n), Ys(n-b \times Ls(n)), (Xs(n)+a \times Ls(n), Ys(n)-b \times Ls(n)), (Xs(n)-a \times Ls(n), Ys(n)+b \times Ls(n)), (Xs(n)+a \times Ls(n), Ys(n)+b \times Ls(n))\}$ at S1005 (when the expansion/contraction parameter p is not designated). However, as described in the first embodiment, the previously used value, the initial value, or the like may be used as the expansion/contraction parameter p.

In the present embodiment, the coordinate value of the belly portion is used as the position of the subject, and the vertical size is used as the size of the subject. However, other values may be used as the position and the size of the subject. For example, the center of gravity or the center of a plurality of coordinate values may be used as the position of the subject, or the lateral size, area, or the like may be used as the size of the subject.

Third Embodiment

Description will be given mainly on part different from the first embodiment.

In the present embodiment, an example of a specific process performed by the video image editing unit 109 will be described.

The video image editing unit 109 receives N cutout images that are converted to be the same size as the parameter Tp as inputs, and generates an intermediate image from two images of the same size corresponding to photographing devices adjacent to each other. For example, from the n+1$^{th}$ image I(n+1,c') and the n$^{th}$ image I(n,c') (see FIG. 10), an intermediate image I(t) between the n+1$^{th}$ image I(n+1,c') and the n$^{th}$ image I(n,c') is generated according to the following expression:

$$B(n+1,t)=1/[1+\text{Exp}[Ng\times\{Tc\times(n-0.5)-t\}/Tc]]$$

$$B(n,t)=1-B(n+1,t)$$

$$I(t)=I(n+1,c')\times B(n+1,t)+I(n,c')\times B(n,t)$$

Note that the blend rates B(n+1,t) and B(n,t) vary according to t as illustrated in FIG. 11, where Tc=Tp/(N−1)

$$t=Tc\times(n-1)+1,\ldots,Tc\times n$$

As an example, Ng=9. The intermediate image I(t) is generated using n=1, 2, ..., N−1. The intermediate images I(t) are aligned in sequence, whereby a wraparound video image having the length Tp is generated.

Other Modifications

The present, invention is not limited to the embodiments and the modifications described above. For example, the various processes described above may be performed not only in a time-series manner as described above but may be performed in parallel or individually according to the processing capacity of the device that performs the process or as required. In addition, changes can be made as appropriate within a scope not deviating from the effect of the present invention.

Program and Recording Medium

Moreover, the various processing functions performed by the respective devices described in the embodiments and the modifications described above may be realized by a computer. In that case, the processing contents of the functions that should be held by the respective devices are described by a program. Then, through execution of the program on the computer, the various processing functions of the various devices are implemented on the computer.

The program describing the processing contents can be recorded on a computer-readable recording medium. A computer-readable recording medium may be, for example, a magnetic recording device, an optical disk, a magneto-optical recording medium, a semiconductor memory, or the like.

Moreover, distribution of the program is performed by selling, assigning, lending, or the like a portable recording medium such as a DVD or a CD-ROM on which the program is recorded. Furthermore, the program may be distributed by being stored on a storage device of a server computer and transferring the program from the server computer to another computer over a network.

A computer that executes such a program first stores the program recorded on a portable recording medium or the program transferred from the server computer, in the storage unit of the own, for example. Then, at the time of executing processing, the computer reads the program stored in the storage unit of the own, and executes processing according to the readout program. As another embodiment of the program, the computer may directly read the program from a portable recording medium and execute processing according to the program. Moreover, each time a program is transferred to the computer from the server computer, the computer may execute processing each time according to the received program. Furthermore, it is also possible to have a configuration of executing processing described above by a service in which transfer of a program to the computer from the server computer is not performed and a processing function is implemented only by the execution instruction and acquisition of the result, that is, a so-called application service provider (ASP) type service. Note that the program includes information to be provided for processing by an electronic computer and is equivalent to the program (data that is not a direct instruction to the computer but has a nature of defining processing by the computer, or the like).

Further, while it is described that each device is configured by execution of a predetermined program on the computer, at least part of the processing content may be implemented by hardware.

The invention claimed is:

1. A video image editing device that obtains a wraparound video image by switching video images captured by N photographing devices where N is an integer of 3 or larger, the photographing devices being arranged so as to surround a subject, the video images being switched along sequence of the photographing devices, the wraparound video image appearing as equivalent to a video image captured by photographing devices going around the subject, the video image editing device comprising a processor configured to execute a method comprising:

applying, to each of images obtained from the N photographing devices, a label indicating a photographing device and a label indicating time;

extracting a combination of information about a position and information about size of the subject existing in an image to which the labels are applied;

generating a polynomial expression regarding the position of the subject and a polynomial expression regarding the size of the subject, based on information about positions and sizes of N subjects;

performing correction or interpolation of the positions of the N subjects by a polynomial approximation curve using the polynomial expression regarding the position of the subject, performs correction or interpolation of the sizes of the N subjects by a polynomial approximation curve using the polynomial expression regarding the size of the subject, and expands or contracts the sizes of the N subjects using an expansion/contraction parameter p;

cutting out, from the N images to which the labels are applied, a cutout range based on the positions and the sizes of the N subjects that were corrected or interpolated and expanded or contracted;

converting the sizes of the N images that are cut out, into a same size; and generating an intermediate image from two images of the same size corresponding to the photographing devices adjacent to each other and generates a wraparound video image, with a parameter indicating a length of the wraparound video image being represented by Tp.

2. The video image editing device according to claim 1, wherein the subject is a human being, the information related to the size of the subject is a skeleton estimation result obtainable by estimation of a skeleton of a human being from an image, where n=1, 2, ... N, the generating the polynomial expression further comprises obtaining a vertical size of each of the N subjects as the size of the subject from the N skeleton estimation results, and when the vertical size is applied to the polynomial expression regarding the size of the subject, in a case where there is an outlier that is larger than a threshold, correction is made by replacing the vertical size that is the outlier with a value obtained from the polynomial expression, and in a case where a vertical size of $n^{th}$ subject is missing, interpolation is made by replacing the vertical size that is missing with a value obtained from the polynomial expression, and expansion and contraction of the subject is controlled by creating a magnification parameter for the N subjects by a quadratic curve with use of the expansion/contraction parameter p, and expanding or contracting the sizes of the N subjects.

3. The video image editing device according to claim 2, wherein the generating the polynomial expression further comprises calculating a cutout range based on the positions and the sizes of the N subjects that are corrected or interpolated and expanded or contracted, that is, {(Xs(n)−a×Ls(n)×$p_n$,Ys(n)−b×Ls(n)×$p_n$), (Xs(n)+a×Ls(n)×$p_n$,Ys(n)−b×Ls(n)×$p_n$), (Xs(n)−a×Ls(n)×$p_n$,Ys(n)+b×Ls(n)×$p_n$), (Xs(n)+a×Ls(n)×$p_n$,Ys(n)+b×Ls(n)×$p_n$)} where $n=1,2,\ldots,N$, $G=(1+n)/2$, $G_2=N-G$, $p_n=p-(p-1)\times\{(n-G)/G_2^2\}$, each of a and b represents a predetermined parameter, (Xs(n),Ys(n)) represents a position of the subject that is corrected or interpolated in an image obtained from $n^{th}$ photographing device, and Ls(n) represents the size of the subject that is corrected or interpolated.

4. The video image editing device according to claim 2, wherein at time t of a wraparound video image, an intermediate image I(t) between $n+1^{th}$ image I(n+1,c') and nth image I(n,c') is represented by $B(n+1,t)=1[1+\mathrm{Exp}[Ng\times[Tc\times n-0.5)-t\}/Tc]]$ $B(n,t)=1-B(n+1,t)$ $I(t)=I(n+1,c')\times B(n+1,t)+I(n,c')\times B(n,t)$ where $Tc=Tp/(N-1), n=1,2,\ldots,N-1$, and $t=Tc\times(n-1)+1, Tc\times n$.

5. The video image editing device according to claim 1, wherein the generating the polynomial expression further comprises calculating a cutout range based on the positions and the sizes of the N subjects that are corrected or interpolated and expanded or contracted, that is, {(Xs(n)−a×Ls(n)×$p_n$,Ys(n)−b×Ls(n)×$p_n$), (Xs(n)+a×Ls(n)×$p_n$,Ys(n)−b×Ls(n)× $p_n$), (Xs(n)−a×Ls(n)×$p_n$,Ys(n)+b×Ls(n)×$p_n$), (Xs(n)+a×Ls(n)×$p_n$,Ys(n)+b×Ls(n)×$p_n$)} where $n=1,2,\ldots,N$, $G=(1+n)/2$ $G_2=N-G$ $P_n=p-(p-1)\times\{(n-G)/G_2^2\}$ each of a and b represents a predetermined parameter, (Xs(n),Ys(n)) represents a position of the subject that is corrected or interpolated in an image obtained from $n^{th}$ photographing device, and Ls(n) represents the size of the subject that is corrected or interpolated.

6. The video image editing device according to claim 5, wherein at time t of a wraparound video image, an intermediate image I(t) between $n+1^{th}$ image I(n+1,c') and $n^{th}$ image I(n,c') is represented by $B(n+1,t)=1[1+\mathrm{Exp}[Ng\times[Tc\times n-0.5)-t\}/Tc]]$ $B(n,t)=1-B(n+1,t)$ $I(t)=I(n+1,c')\times B(n+1,t)+I(n,c')\times B(n,t)$ where $Tc=Tp/(N-1), n=1,2,\ldots,N-1$, and $t=Tc\times(n-1)+1, Tc\times n$.

7. The video image editing device according to claim 1, wherein at time t of a wraparound video image, an intermediate image I(t) between $n+1^{th}$ image I(n+1,c') and $n^{th}$ image I(n,c') is represented by $B(n+1,t)=1/[1+\mathrm{Exp}[Ng\times\{Tc\times(n-0.5)-t\}/Tc]]$ $B(n,t)=1-B(n+1,t)$ $I(t)=I(n+1,c')\times B(n+1,t)+I(n,c')\times B(n,t)$ where $Tc=Tp/(N-1), n=1,2,\ldots,N-1$, and $t=Tc\times(n-1)+1, Tc\times n$.

8. A video image editing method for obtaining a wraparound video image by switching video images captured by N photographing devices where N is an integer of 3 or larger, the photographing devices being arranged so as to surround a subject, the video images being switched along sequence of the photographing devices, the wraparound video image appearing as equivalent to a video image captured by photographing devices going around the subject, the video image editing method comprising:

applying a label indicating a photographing device and a label indicating time to each of images obtained from the N photographing devices;

extracting a combination of information about a position and information about a size of the subject existing in an image to which the labels are applied;

generating a polynomial expression regarding the position of the subject and a polynomial expression regarding the size of the subject, based on information about positions and sizes of the N subjects, performing correction or interpolation of the positions of the N subjects by a polynomial approximation curve using the polynomial expression regarding the position of the subject, performing correction or interpolation of the sizes of the N subjects by a polynomial approximation curve using the polynomial expression regarding the size of the subject, and expanding or contracting the sizes of the N subjects using an expansion/contraction parameter p;

cutting out, from the N images to which the labels are applied, a cutout range based on the positions and the sizes of the N subjects that were corrected or interpolated and expanded or contracted;

converting the sizes of the N images that are cut out, into a same size; and generating an intermediate image from two images of the same size corresponding to the photographing devices adjacent to each other and generating a wraparound video image, with a parameter indicating a length of the wraparound video image being represented by Tp.

9. A computer-readable non-transitory recording medium storing computer-executable program instructions that when executed by a processor cause a computer to execute a video image editing method for obtaining a wraparound video image by switching, with use of a video image editing device, video images captured by N photographing devices where N is an integer of 3 or larger, the photographing devices being arranged so as to surround a subject, the video images being switched along sequence of the photographing devices, the wraparound video image appearing as equivalent to a video image captured by photographing devices going around the subject, the video image editing method comprising:

applying a label indicating a photographing device and a label indicating time to each of images obtained from the N photographing devices;

extracting a combination of information about a position and information about a size of the subject existing in an image to which the labels are applied;

generating a polynomial expression regarding the position of the subject and a polynomial expression regarding the size of the subject, based on information about positions and sizes of the N subjects, performing correction or interpolation of the positions of the N subjects by a polynomial approximation curve using the polynomial expression regarding the position of the subject, performing correction or interpolation of the sizes of the N subjects by a polynomial approximation curve using the polynomial expression regarding the size of the subject, and expanding or contracting the sizes of the N subjects using an expansion/contraction parameter p;

cutting out, from the N images to which the labels are applied, a cutout range based on the positions and the sizes of the N subjects that were corrected or interpolated and expanded or contracted;

converting the sizes of the N images that are cut out, into a same size; and generating an intermediate image from two images of the same size corresponding to the photographing devices adjacent to each other and generating a wraparound video image, with a parameter indicating a length of the wraparound video image being represented by Tp.

* * * * *